(12) United States Patent
Beneventi et al.

(10) Patent No.: US 11,725,368 B1
(45) Date of Patent: Aug. 15, 2023

(54) AUTOMATIC SHUTOFF VALVE FOR BREAKAWAY WET BARREL FIRE HYDRANT

(71) Applicants: Alan D. Beneventi, San Diego, CA (US); John G. Polifka, San Diego, CA (US)

(72) Inventors: Alan D. Beneventi, San Diego, CA (US); John G. Polifka, San Diego, CA (US)

( * ) Notice: Subject to any disclaimer, the term of this patent is extended or adjusted under 35 U.S.C. 154(b) by 0 days.

(21) Appl. No.: 17/835,721

(22) Filed: Jun. 8, 2022

Related U.S. Application Data

(63) Continuation of application No. 17/692,986, filed on Mar. 11, 2022, now Pat. No. 11,377,826.

(51) Int. Cl.
*E03B 9/04* (2006.01)
*F16L 55/10* (2006.01)
*F16K 17/40* (2006.01)

(52) U.S. Cl.
CPC .............. *E03B 9/04* (2013.01); *F16K 17/406* (2013.01); *F16L 55/1007* (2013.01)

(58) Field of Classification Search
CPC ....... E03B 9/04; F16K 17/406; F16L 55/1007
USPC ........... 137/451, 68.1, 68.14, 272, 291, 292, 137/382.5, 797; 251/305, 298
See application file for complete search history.

(56) References Cited

U.S. PATENT DOCUMENTS

| | | | |
|---|---|---|---|
| 4,127,142 A | 11/1978 | Snider | |
| 5,609,179 A | 3/1997 | Knapp | |
| 6,401,745 B1 | 6/2002 | Corder | |
| 7,128,083 B2 | 10/2006 | Fleury et al. | |
| 7,267,136 B2 | 9/2007 | Fleury et al. | |
| 8,991,415 B1 | 3/2015 | Luppino | |
| 9,353,878 B2 | 5/2016 | Plummer et al. | |
| 9,551,330 B2 | 1/2017 | Drube | |
| 10,407,882 B2 | 9/2019 | Kitchen et al. | |
| 10,767,775 B2 | 9/2020 | Huelsman | |
| 11,156,303 B2 | 10/2021 | Allen et al. | |
| 2005/0224114 A1 | 10/2005 | Cook et al. | |
| 2015/0240962 A1 | 8/2015 | Plummer et al. | |
| 2016/0265197 A1 | 9/2016 | Kitchen et al. | |
| 2017/0307097 A1 | 10/2017 | Plummer | |
| 2018/0171606 A1 | 6/2018 | Kitchen et al. | |
| 2020/0256474 A1 | 8/2020 | Huelsman | |

(Continued)

OTHER PUBLICATIONS

"J6000 Series Break Check Industry-Leading Infrastructure Protection", brochure by Jones Mueller Brand, 2020, 2 pages.

(Continued)

*Primary Examiner* — Minh Q Le

(57) ABSTRACT

An automatic shutoff valve for breakaway wet barrel fire hydrant is disclosed. In general, one aspect disclosed features an apparatus comprising: a valve housing comprising a valve body, a flange, and a valve seat; a valve pedal configured to engage the valve seat and prevent fluid flow through the valve seat in a closed position, and to permit fluid flow through the valve seat in an open position; a lockout tab disposed within the valve body, wherein the lockout tab maintains the valve pedal in the open position; a lockout bar disposed distally from the valve body; and an activation rod mechanically coupled to the lockout bar and configured to keep the valve pedal engaged with the lockout tab.

11 Claims, 20 Drawing Sheets

(56) References Cited

U.S. PATENT DOCUMENTS

2020/0326001 A1   10/2020  Plummer
2022/0390037 A1*  12/2022  Allen ................... F16K 15/038

OTHER PUBLICATIONS

Non-Final Office Action issued in U.S. Appl. No. 17/692,986, dated Apr. 22, 2022, 9 pages.

* cited by examiner

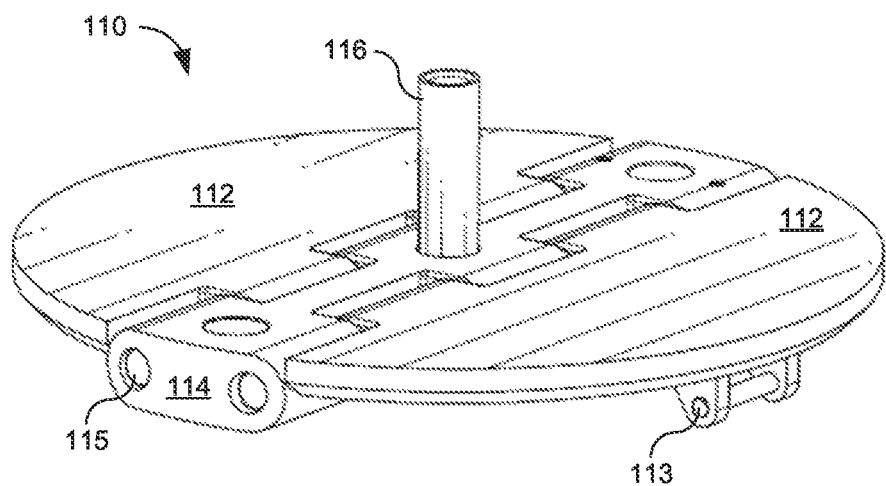
FIG. 28
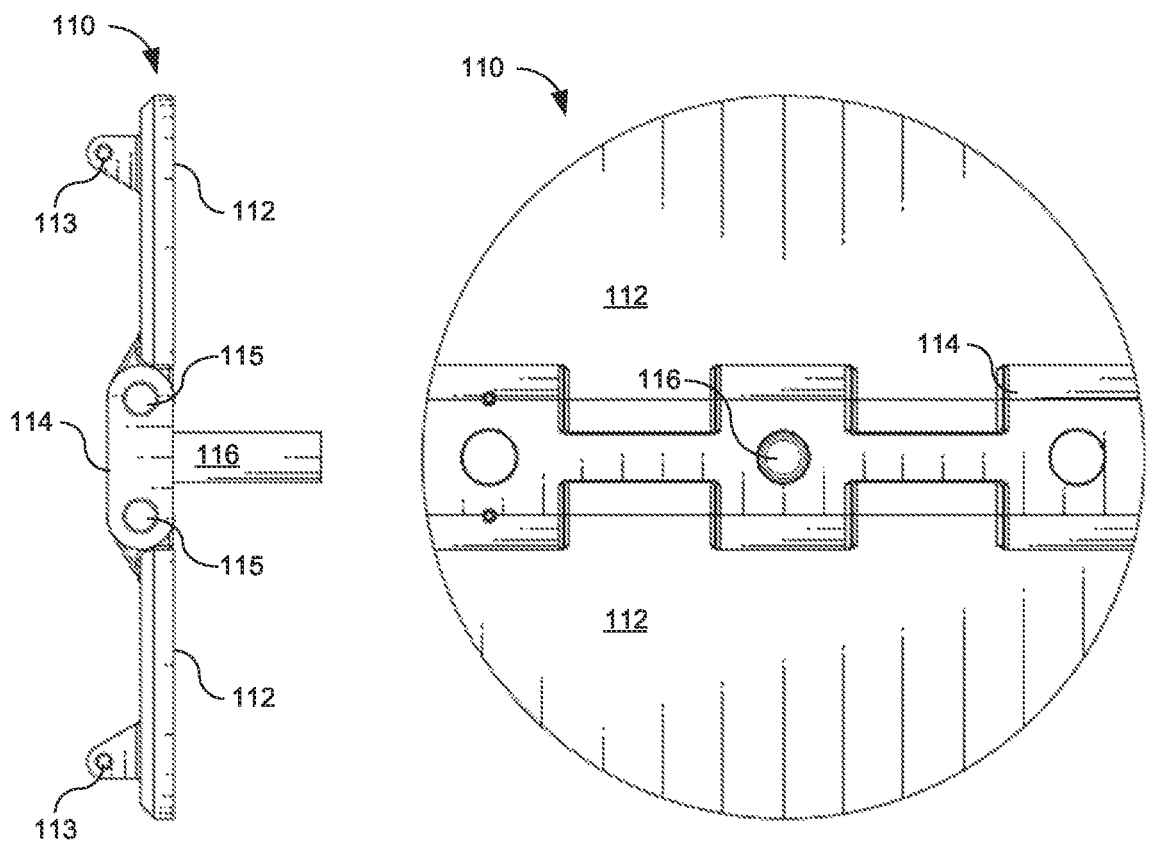
FIG. 29
FIG. 30

AUTOMATIC SHUTOFF VALVE FOR BREAKAWAY WET BARREL FIRE HYDRANT

CROSS REFERENCE TO RELATED APPLICATIONS

The present application is a continuation of U.S. patent application Ser. No. 17/692,986, filed Mar. 11, 2022, entitled "AUTOMATIC SHUTOFF VALVE FOR BREAKAWAY WET BARREL FIRE HYDRANT," the disclosure thereof incorporated by reference herein in its entirety.

DESCRIPTION OF RELATED ART

The disclosed technology relates generally to fire hydrants, and more particularly some embodiments relate shutoff valves for fire hydrants.

SUMMARY

In general, one aspect disclosed features an apparatus comprising: a valve housing comprising a valve body, a flange, and a valve seat; a valve pedal configured to engage the valve seat and prevent fluid flow through the valve seat in a closed position, and to permit fluid flow through the valve seat in an open position; a lockout tab disposed within the valve body, wherein the lockout tab maintains the valve pedal in the open position; a lockout bar disposed distally from the valve body; and an activation rod mechanically coupled to the lockout bar and configured to keep the valve pedal engaged with the lockout tab.

Embodiments of the apparatus may include one or more of the following features. In some embodiments, the valve body is configured to be disposed within a fluid supply pipe, and the flange is configured to mate with a flange of the fluid supply pipe. In some embodiments, when the activation rod is not present, the valve pedal disengages from the lockout tab, and a flow of fluid passing the valve pedal moves the valve pedal from the open position to the closed position. Some embodiments comprise a spring configured to urge the valve pedal away from the lockout tab; wherein, when the activation rod is not present, the spring causes the valve pedal to disengage from the lockout tab, and a flow of fluid passing the valve pedal moves the valve pedal from the open position to the closed position. Some embodiments comprise a collar disposed between the lockout bar and the valve body. In some embodiments, the collar is a breakaway collar. Some embodiments comprise a hydrant, wherein the collar is secured to the hydrant by a breakaway collar. Some embodiments comprise a valve slide slidably mounted within the valve body, wherein the valve pedal is pivotally mounted to the valve slide, and wherein the activation rod is configured to press the slide toward the lockout tab; and a spring configured to urge the valve slide away from the lockout tab. Some embodiments comprise a bottom saddle comprising the lockout tab, wherein the bottom saddle is fixedly mounted within the valve body. Some embodiments comprise a lockout ring disposed distally from the valve body, the lockout ring comprising the lockout bar. Some embodiments comprise a spring configured to urge the valve pedal from the open position toward the closed position.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 28 is an isometric view of the flapper assembly of the main body assembly according to some embodiments of the disclosed technologies.

FIG. 29 is a side view of the flapper assembly according to some embodiments of the disclosed technologies.

FIG. 30 is a top view of the flapper assembly according to some embodiments of the disclosed technologies.

FIG. 43 is an isometric view of the slide pin according to some embodiments of the disclosed technologies.

Figure 1:
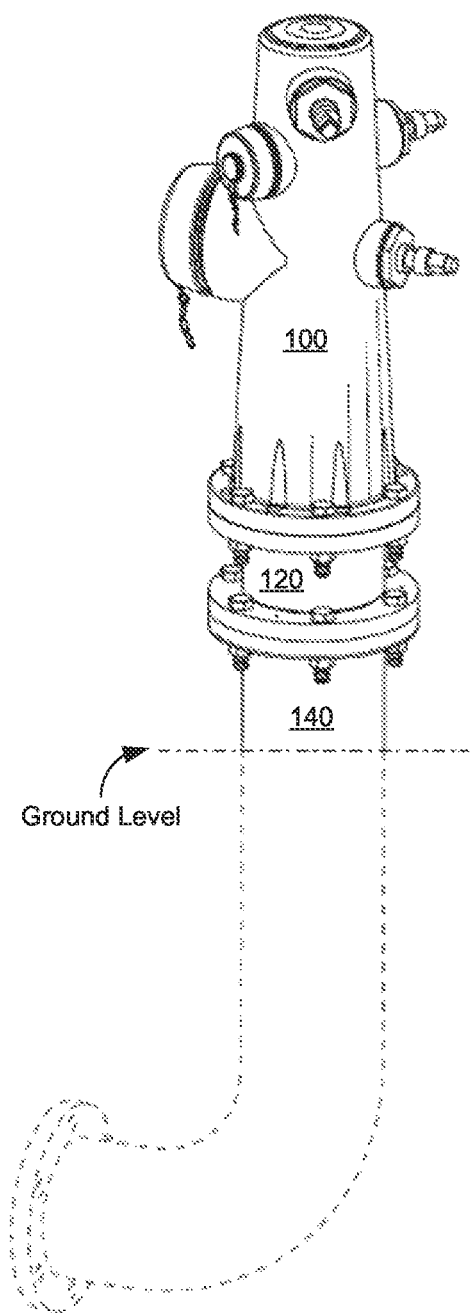
FIG. 1 illustrates a conventional fire hydrant installation.

The figures are not exhaustive and do not limit the present disclosure to the precise form disclosed.

DETAILED DESCRIPTION

Fire hydrants form a critical part of our infrastructure by providing an on-demand supply of water to firefighters. But occasionally fire hydrants are damaged, for example in collisions with automobiles. In such accidents the hydrant is usually removed from its riser entirely, resulting in a large discharge of water. This high-pressure flow presents a direct danger to persons nearby. The large volume of water discharged often floods nearby streets, businesses, and homes. The economic devastation from these floods is significant.

Furthermore, stopping the discharge of water from the riser is non-trivial. The shutoff valve is generally located underground at some distance from the riser. The valve must be located and unearthed before it can be operated to stop the discharge. Streets must be closed and heavy equipment delivered to locate and unearth the valve. Sometimes this process takes hours, by which time the volume of water discharged is great, and the resulting damage extensive.

Embodiments of the present disclosure provide automatic shutoff valve for breakaway wet barrel fire hydrants. These hydrants are designed to break away when struck by a vehicle or the like, generally through the use of a breakaway collar, breakaway bolts, or both. According to these embodiments, when the hydrant breaks away, an activation rod causes a valve assembly to shut, thereby stopping the discharge of water. The valve assembly is designed to fit within the existing main water supply riser. This feature makes the valve assembly ideal for retrofitting existing hydrants.

The disclosed technology is described in terms of fire hydrants and water. But as will be readily apparent to one skilled in the art, this technology is readily applicable to other valves and other fluids.

A list of parts shown in the drawings is presented below, along with example materials, quantities and dimensions. However, it should be understood that various embodiments of the disclosed technology may be implemented with more or fewer parts, with other materials and dimensions, and combinations thereof.

Hydrant 100, qty 1
Main body assembly 102, qty 1
Main body 103, may be stainless steel 304, qty 1
Bottom saddle 104, may be stainless steel 304, qty 1
Side slide pin 105, qty 2

Compression spring 106, qty 2
Slotted spring pin 107, qty 2
Countersunk screws 108, may be $^{10}/_{32}"$, qty 4
Seal 109, may be $^{1}/_{16}"$ rubber sheet, may be bonded, qty 4
Flapper assembly 110, qty 1
Pedal assembly 111, qty 2
Pedal 112, qty 2
Dowel pin 113, qty 2
Slide 114, may be stainless steel 304, qty 1
Pin 115, may be 0.25" DIA X 5.2" LONG, qty 2
Slide pin 116, qty 1
Slotted spring pin 117, qty 2
Lockout plate assembly 118, qty 1
Lockout plate 119, may be stainless steel 304, qty 1
Break off collar 120, qty 1
Countersunk screws 121, may be $^{10}/_{32}"$, qty 6
Activation rod 122, qty 1
Washer 123, may be $^{1}/_{4}"$, qty 2
Nut 124, may be $^{1}/_{4}"$, qty 2
Lock washer 125, may be $^{1}/_{4}"$, qty 2
Breakaway bolt 126, with nuts, qty 6
Bolt 127, with nuts, qty 6
Riser 140
Retention tabs 204, qty 2
Valve seat 206

Figure 2:
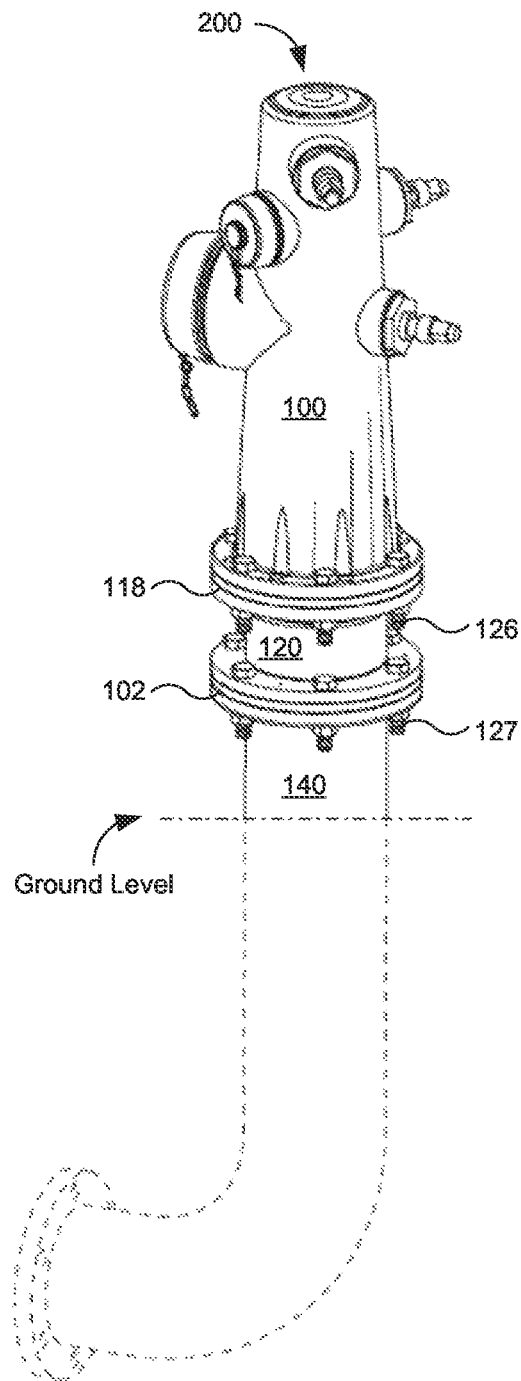
FIG. 2 illustrates a fire hydrant installation according to some embodiments of the disclosed technologies.

FIG. 1 illustrates a conventional fire hydrant installation. FIG. 2 illustrates a fire hydrant installation 200 according to some embodiments of the disclosed technologies. Referring to FIG. 2, portions of the main body assembly 102 and lockout plate assembly 118 are visible. In some embodiments, breakaway bolts 126 and nuts are used to secure the lockout plate assembly 118 between the hydrant 100 and the breakoff collar 120. This arrangement allows the hydrant to break away cleanly, at the bolts 126, at the breakoff collar 120, or both.

Figure 3:
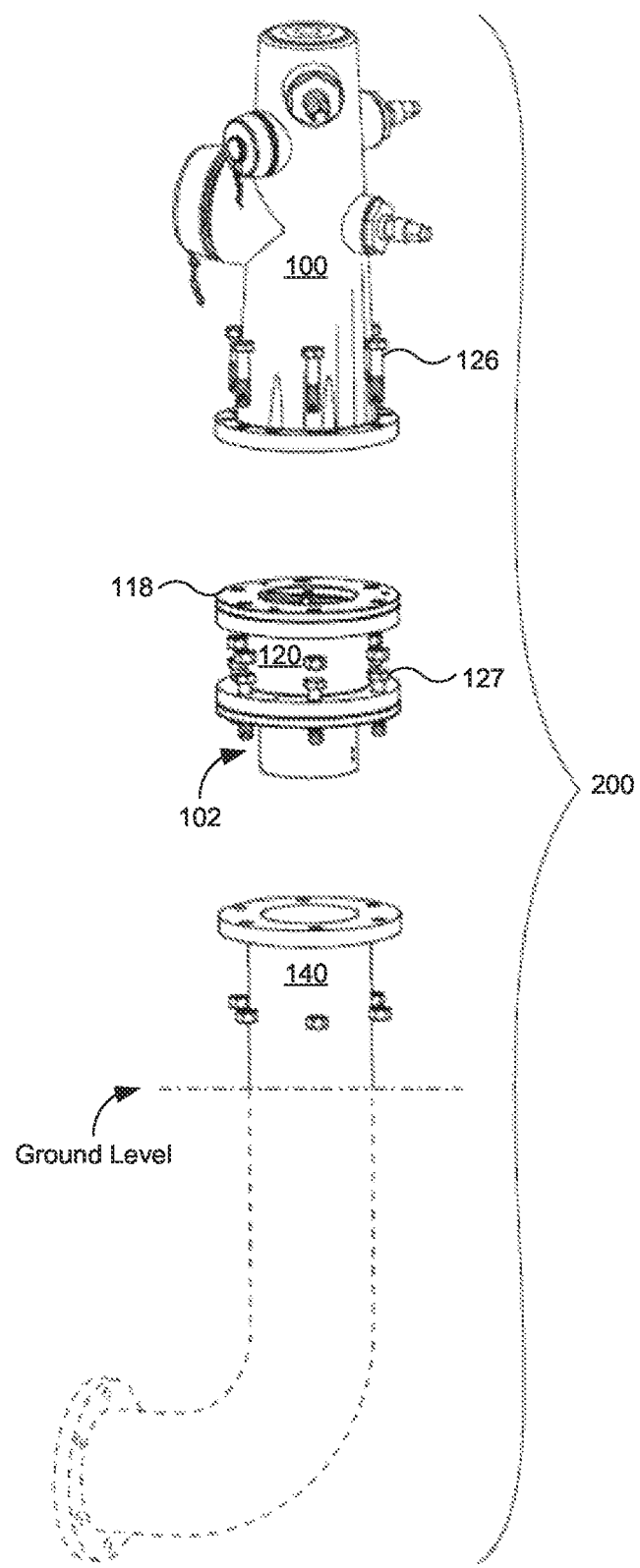
FIG. 3 illustrates components of the fire hydrant installation of FIG. 2 according to some embodiments of the disclosed technologies.

FIG. 3 illustrates components of the fire hydrant installation 200 of FIG. 2 according to some embodiments of the disclosed technologies.

Figure 4:
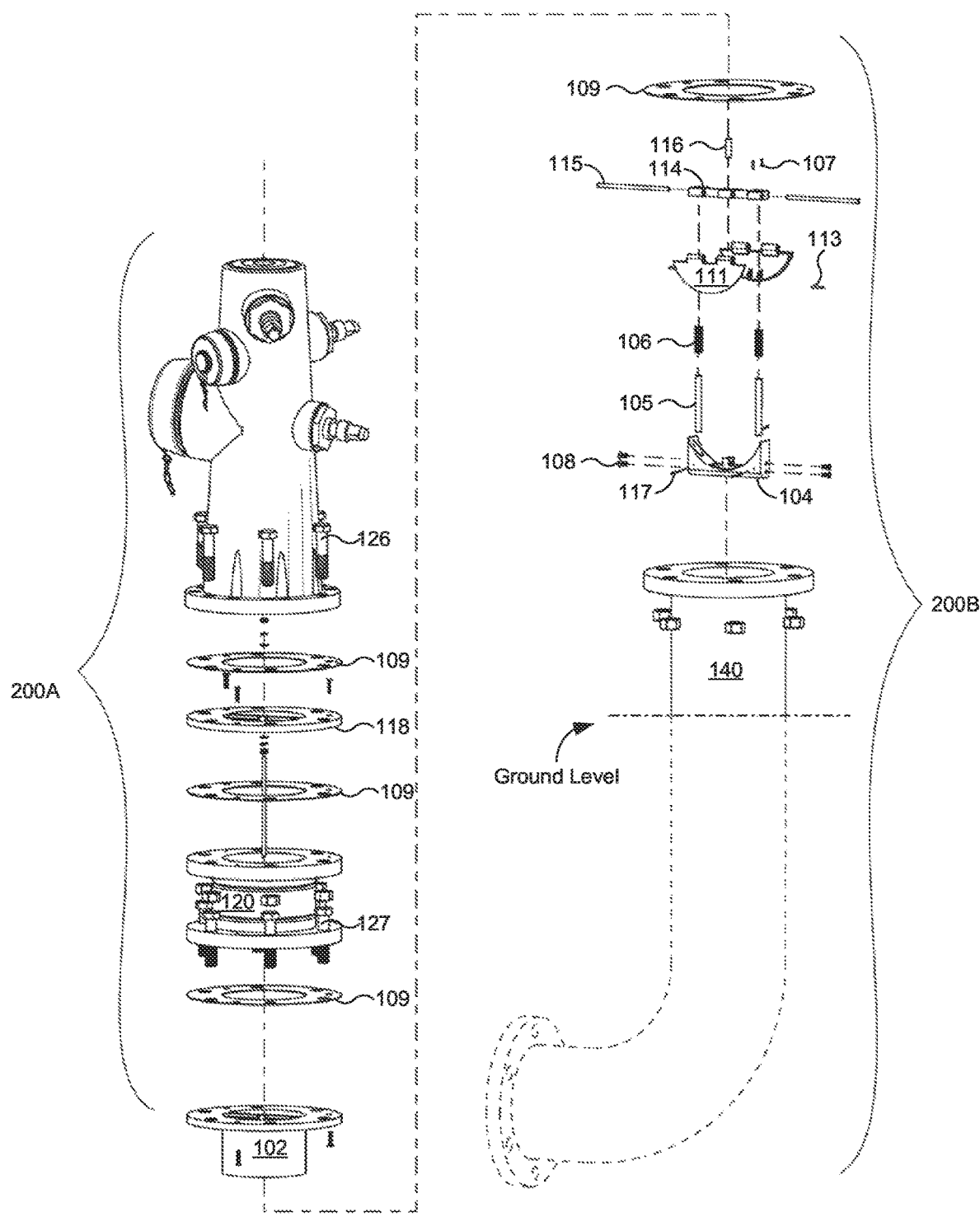
FIG. 4 is an exploded view of the fire hydrant installation of FIG. 2 according to some embodiments of the disclosed technologies.

FIG. 4 is an exploded view of the fire hydrant installation 200 of FIG. 2 according to some embodiments of the disclosed technologies.

Figure 5:
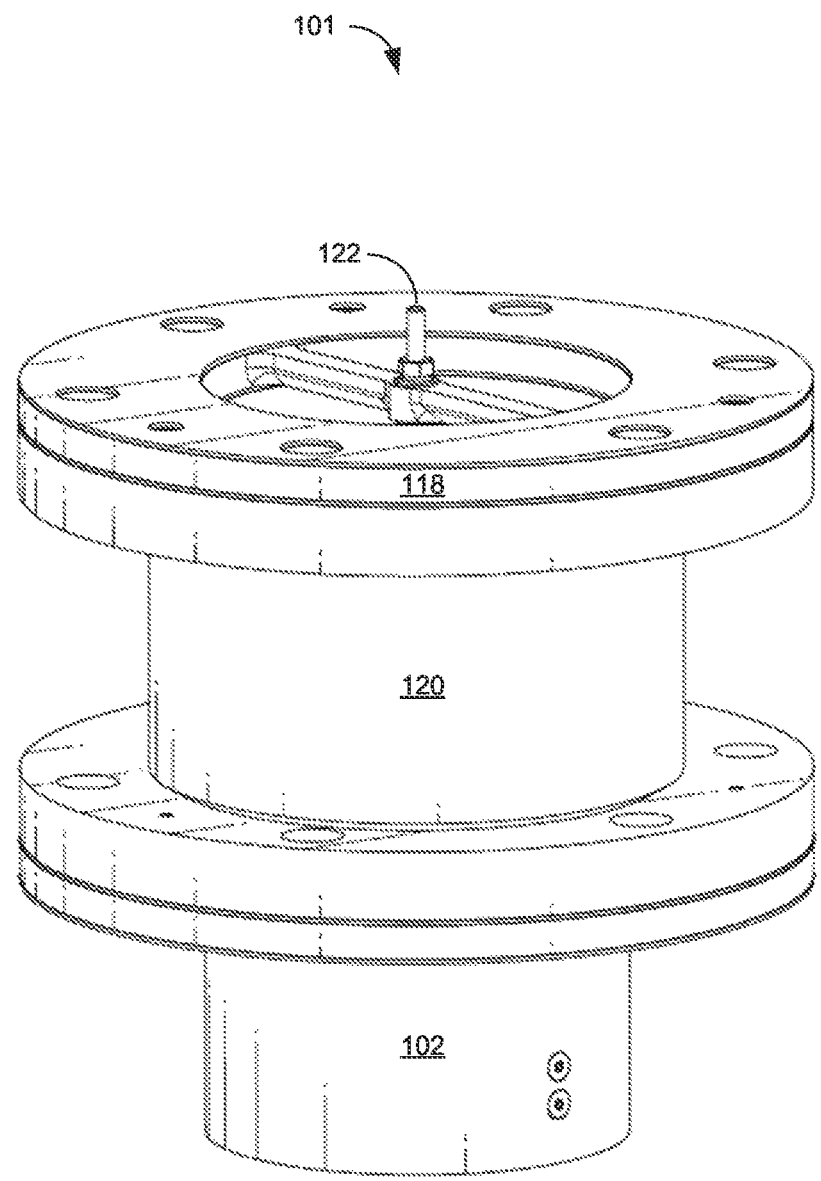
FIG. 5 illustrates the water shutoff valve assembly of FIG. 4 according to some embodiments of the disclosed technologies.

FIG. 5 illustrates the water shutoff valve assembly 101 and breakoff collar 120 of FIG. 4 according to some embodiments of the disclosed technologies.

Figure 6:
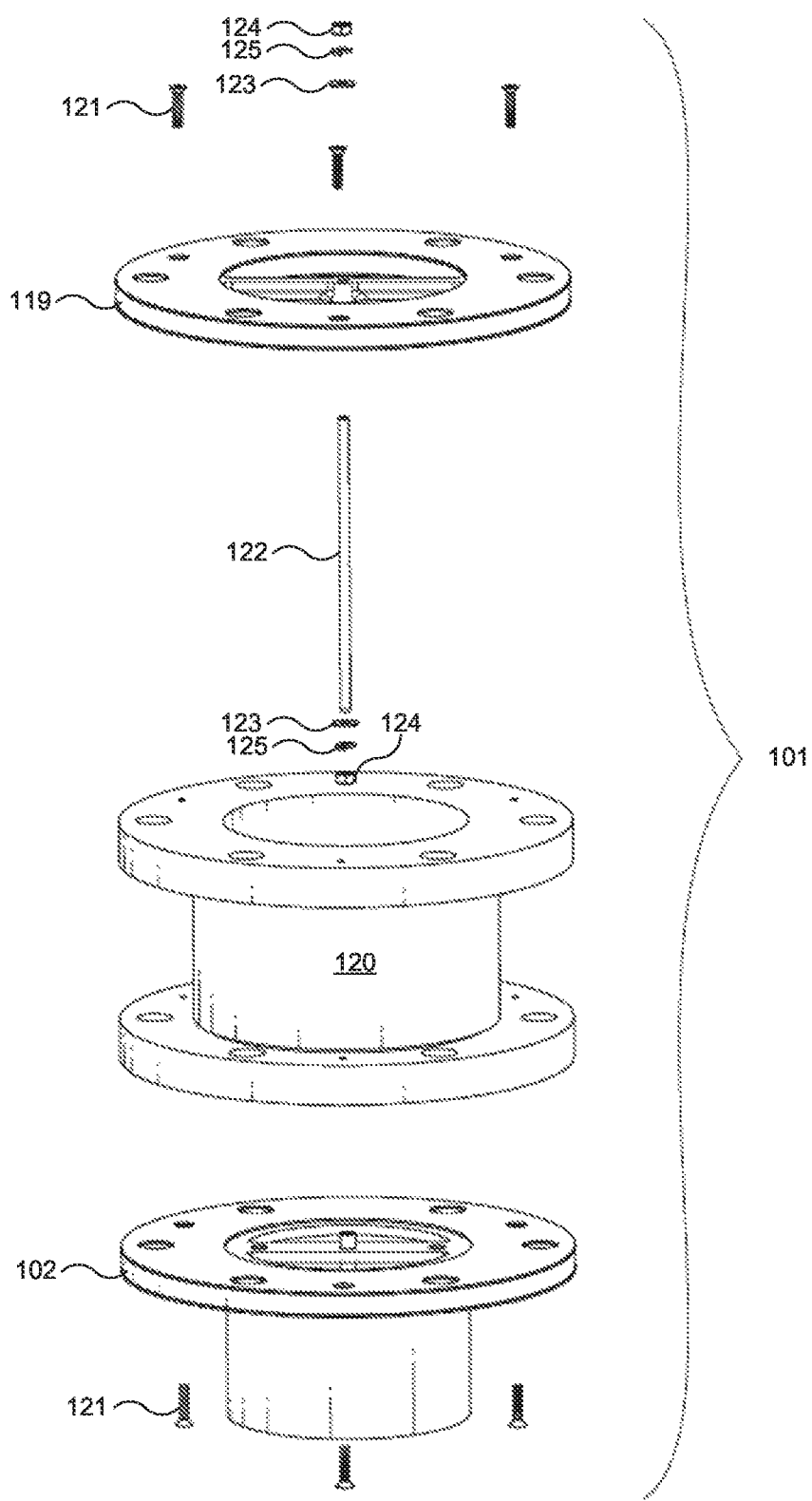
FIG. 6 is an exploded view of the water shutoff valve assembly of FIG. 4 according to some embodiments of the disclosed technologies.

FIG. 6 is an exploded view of the water shutoff valve assembly 101 of FIG. 5 according to some embodiments of the disclosed technologies. When assembled, the lockout plate 119 may be secured to the top flange of the breakoff collar 120, and the main body assembly 102 may be secured to the lower flange of the breakoff collar, by screws 121. The upper end of the activation rod 122 may be secured to the crossbar of the lockout plate 119 by nuts 124, washers 123, and lockwashers 125.

Figure 7:
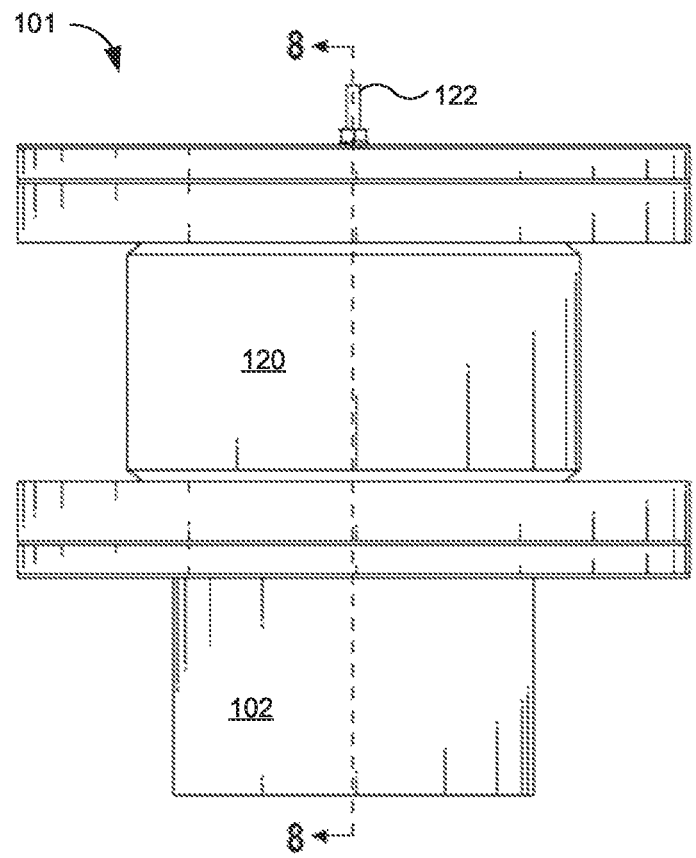
FIG. 7 illustrates the water shutoff valve assembly of FIG. 4 according to some embodiments of the disclosed technologies.
Figure 8:
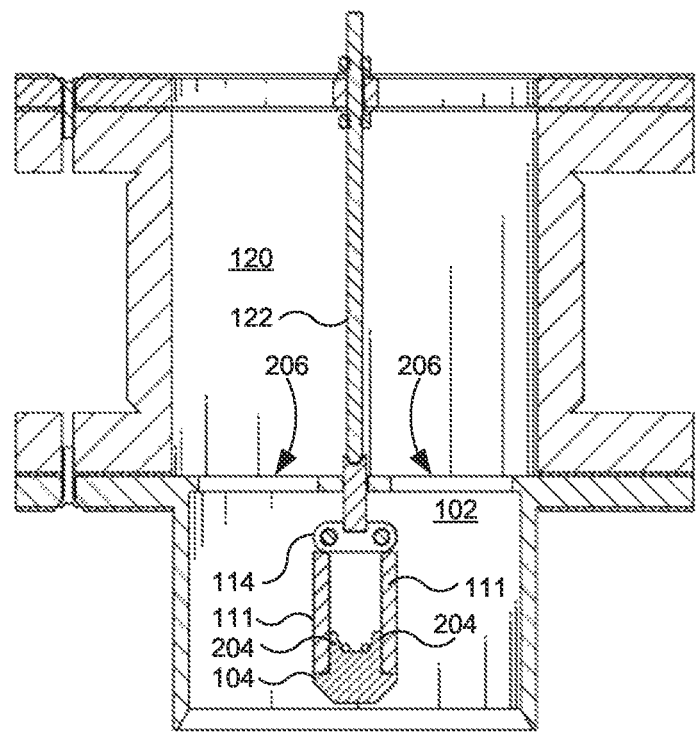
FIG. 8 is a cutaway view of the water shutoff valve assembly of FIG. 7 according to some embodiments of the disclosed technologies.

FIG. 7 illustrates the water shutoff valve assembly 101 and breakoff collar 120 of FIG. 5 according to some embodiments of the disclosed technologies. FIG. 8 is a cutaway view of the water shutoff valve assembly 101 and breakoff collar 120 of FIG. 7 according to some embodiments of the disclosed technologies.

Figure 9:
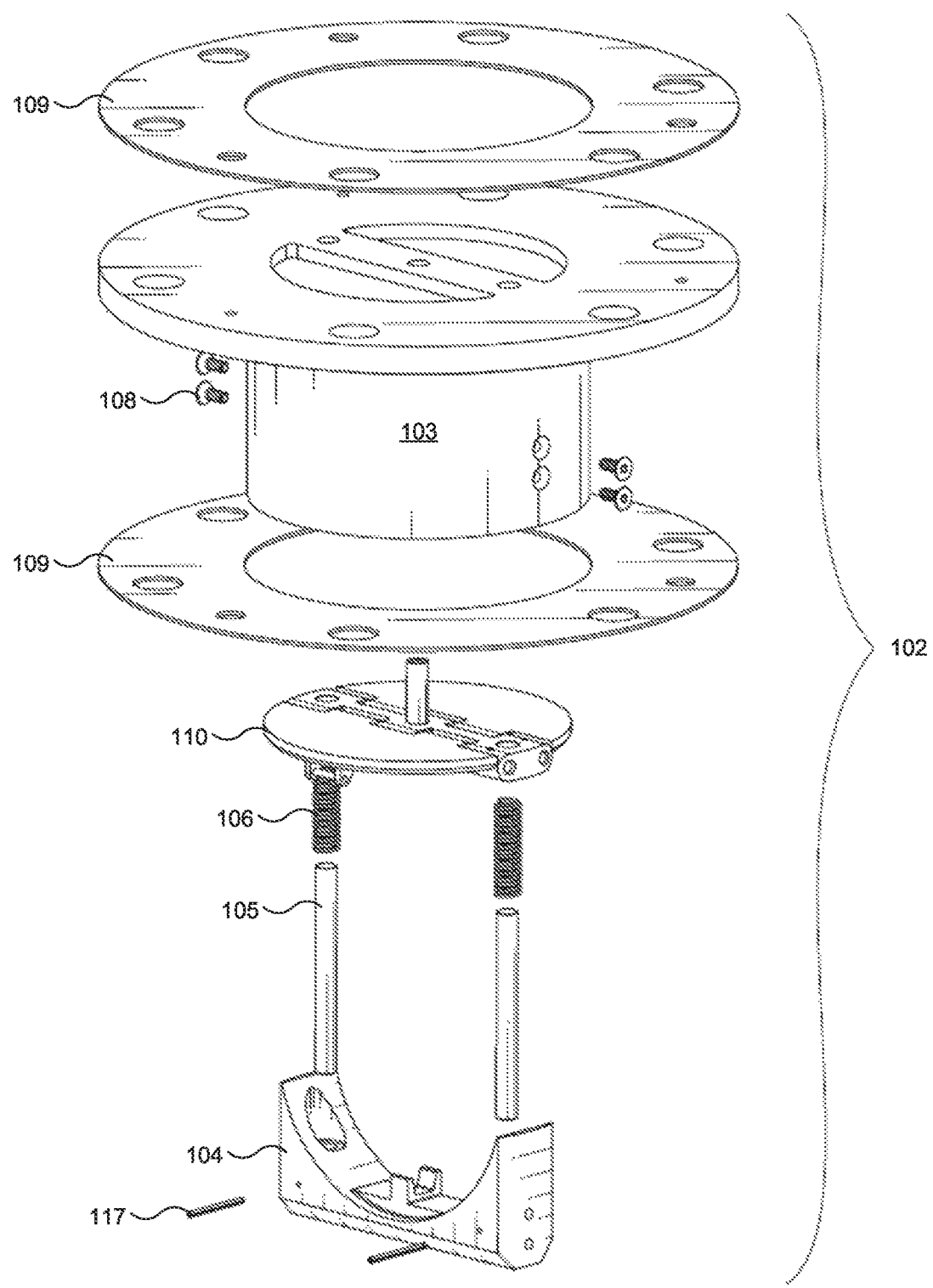
FIG. 9 is an exploded view of the main body assembly of FIG. 8 according to some embodiments of the disclosed technologies.

FIG. 9 is an exploded view of the main body assembly 102 of FIG. 8 according to some embodiments of the disclosed technologies. The main body assembly 102 may include the main body 103, the flapper assembly 110, two side slide pins 105, compression springs 106, and the saddle 104. The two side slide pins 105 may be disposed in corresponding holes in the saddle 104, and retained therein with two slotted spring pins 117. The compression springs 106 may be placed over the side slide pins 105. The flapper assembly 110 may then be placed over the side slide pins 105. Holes in the flapper assembly 110 allow the flapper assembly to slide up and down along the side slide pins 105. The main body 103 may be paced over these elements, and may be secured to the saddle 104 by screws 108. Seals 109 may be used on both sides of the flange of the main body 103.

Figure 10:
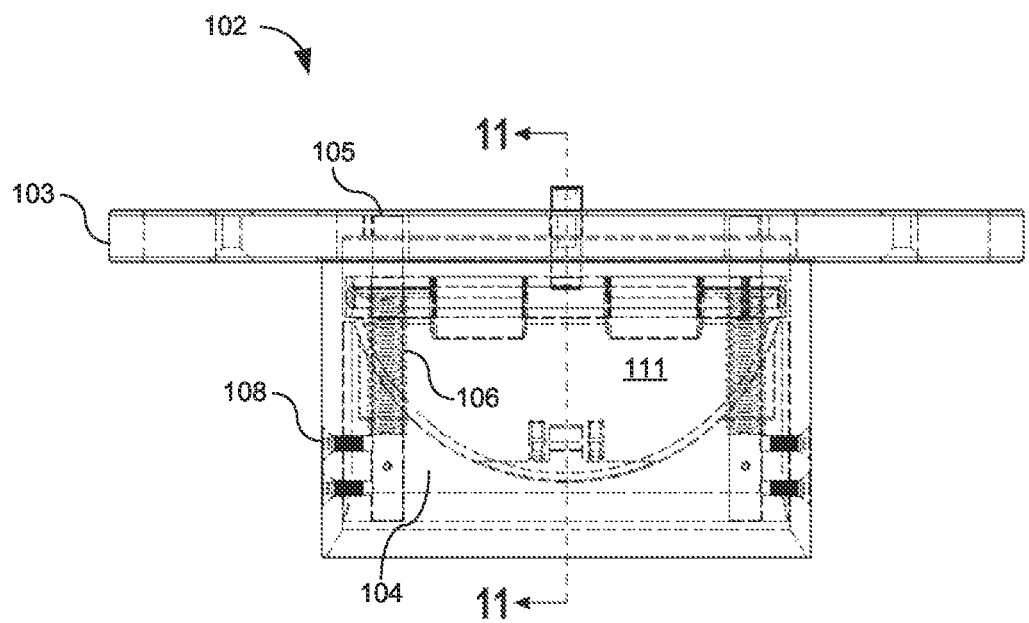
FIG. 10 is an internal view of the main body assembly of FIG. 9 with the pedals in the open position according to some embodiments of the disclosed technologies.
Figure 11:
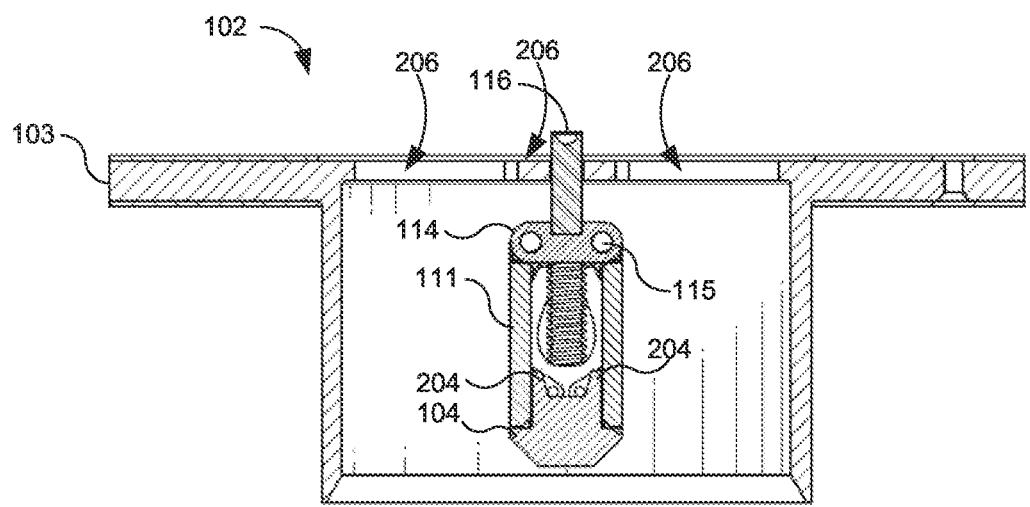
FIG. 11 is a cutaway view of the main body assembly of FIG. 10 according to some embodiments of the disclosed technologies.

FIG. 10 is an internal view of the main body assembly 102 of FIG. with the pedals 112 in the open position according to some embodiments of the disclosed technologies. FIG. 11 is a cutaway view of the main body assembly 102 of FIG. 10 according to some embodiments of the disclosed technologies. In the open configuration, the slide 114 is held in the lower position against springs 106 in FIG. 9 by the slide pin 116, and the pedals 112 are held in the open position through engagement with the saddle 104.

Figure 12:
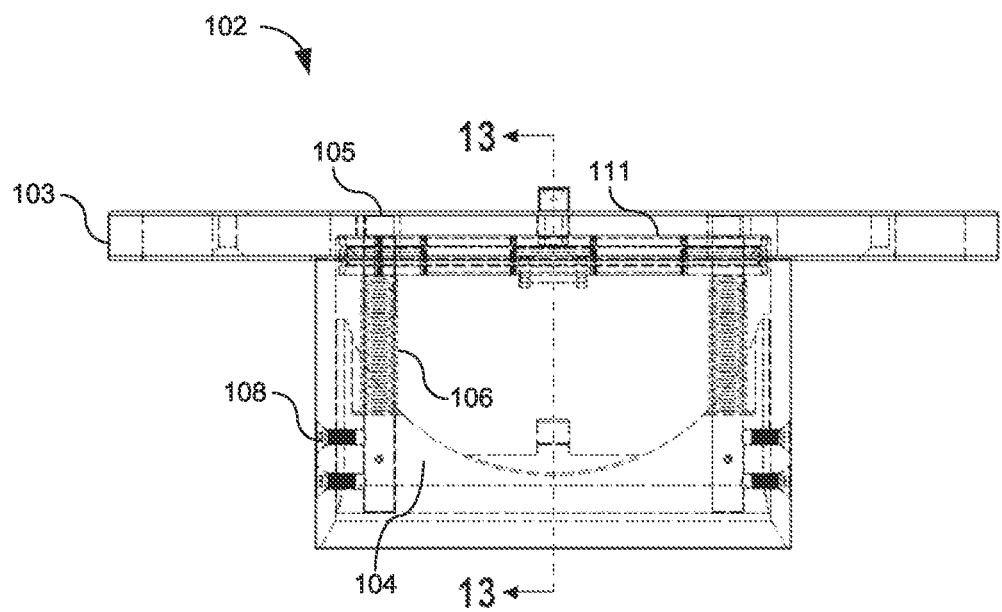
FIG. 12 is an internal view of the main body assembly of FIG. 9 with the pedals in the closed position according to some embodiments of the disclosed technologies.
Figure 13:
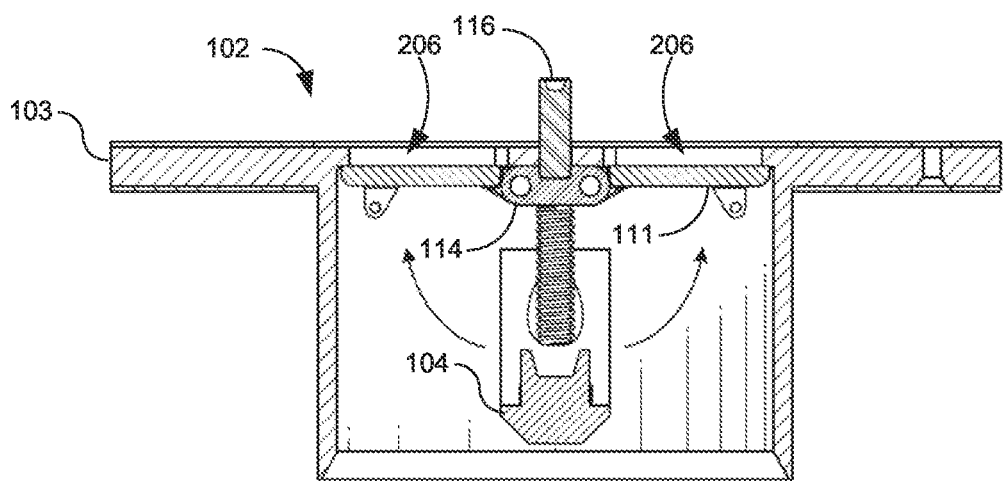
FIG. 13 is a cutaway view of the main body assembly of FIG. 12 according to some embodiments of the disclosed technologies.

FIG. 12 is an internal view of the main body assembly 102 of FIG. 8 with the pedals in the closed position according to some embodiments of the disclosed technologies. FIG. 13 is a cutaway view of the main body assembly of FIG. 12 according to some embodiments of the disclosed technologies. When the activation rod 122 is not present, for example due to accidental removal of the fire hydrant 100, the springs 106 force the slide upward and away from the saddle, freeing the pedals 112 from the saddle 104. The force of the flowing water urges the pedals 112 upward against the valve seat 206 of the main body 103, thereby shutting off the flow of water. Some embodiments may include one or more springs to assist with the motion of the pedals.

Figure 14:
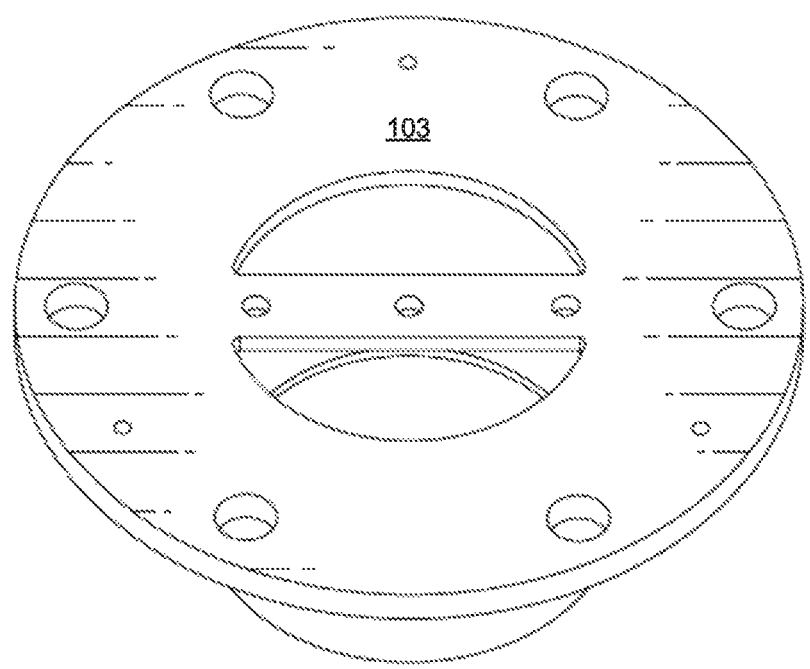
FIG. 14 illustrates the main body of the main body assembly according to some embodiments of the disclosed technologies.
Figure 15:
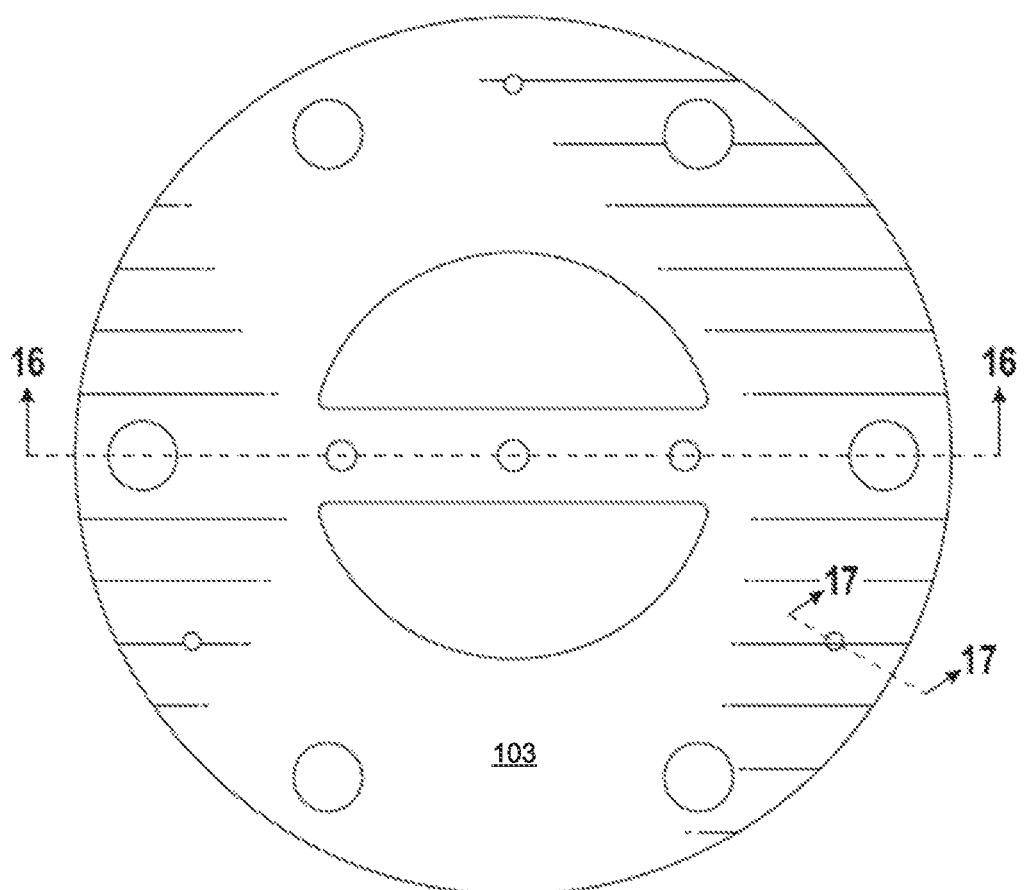
FIG. 15 is a top view of the main body according to some embodiments of the disclosed technologies.
Figure 16:
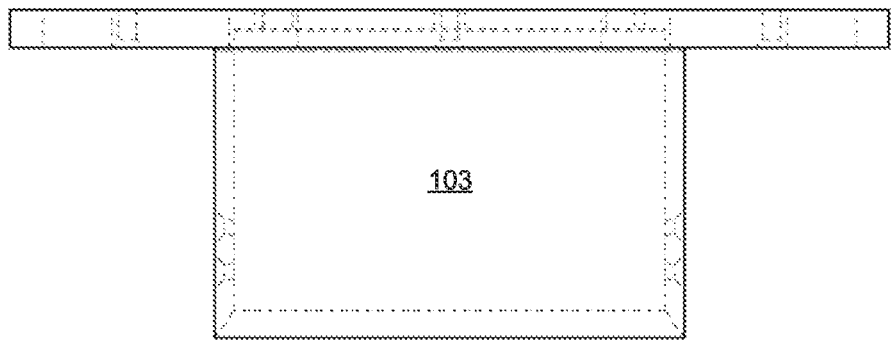
FIG. 16 is a cutaway view of the main body of FIG. 15 according to some embodiments of the disclosed technologies.
Figure 17:
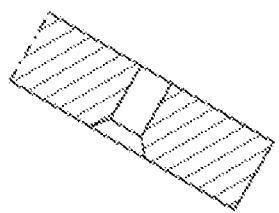
FIG. 17 is a cutaway view of the main body of FIG. 15 according to some embodiments of the disclosed technologies.

FIG. 14 illustrates the main body of the main body assembly according to some embodiments of the disclosed technologies. FIG. 15 is a top view of the main body according to some embodiments of the disclosed technologies. FIG. 16 is a cutaway view of the main body of FIG. 15 according to some embodiments of the disclosed technologies. FIG. 17 is a cutaway view of the main body of FIG. 15 according to some embodiments of the disclosed technologies.

Figure 18:
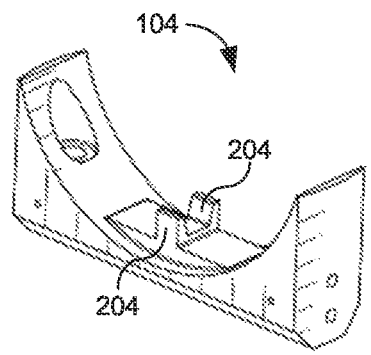
FIG. 18 illustrates the saddle of the main body assembly according to some embodiments of the disclosed technologies.
Figure 19:
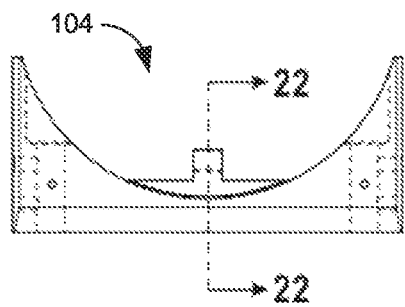
FIG. 19 is a detail view of the saddle according to some embodiments of the disclosed technologies.
Figure 20:
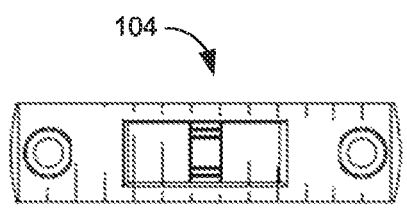
FIG. 20 is a top view of the saddle according to some embodiments of the disclosed technologies.
Figure 21:
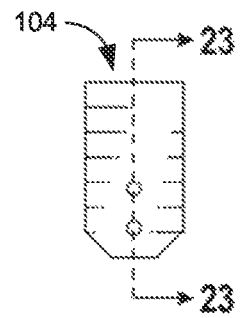
FIG. 21 is a side view of the saddle according to some embodiments of the disclosed technologies.
Figure 23:
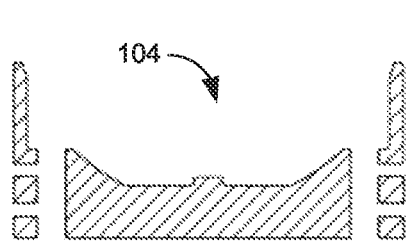
FIG. 23 is a cutaway view of the saddle of FIG. 21 according to some embodiments of the disclosed technologies.
Figure 22:
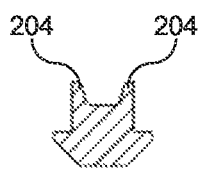
FIG. 22 is a cutaway view of the saddle of FIG. 19 according to some embodiments of the disclosed technologies.

FIG. 18 illustrates the saddle of the main body assembly according to some embodiments of the disclosed technologies. FIG. 19 is a detail view of the saddle according to some embodiments of the disclosed technologies. FIG. 20 is a top view of the saddle according to some embodiments of the disclosed technologies. FIG. 21 is a side view of the saddle according to some embodiments of the disclosed technologies. FIG. 22 is a cutaway view of the saddle of FIG. 19 according to some embodiments of the disclosed technologies. FIG. 23 is a cutaway view of the saddle of FIG. 21 according to some embodiments of the disclosed technologies. In these views the retention tabs 204 of the saddle are visible.

Figure 24:
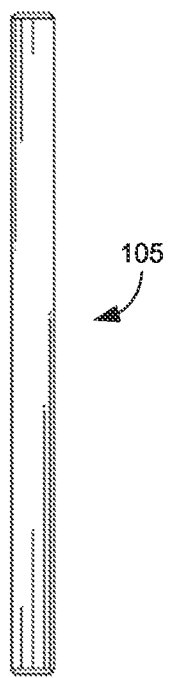
FIG. 24 illustrates the side slide pin of the main body assembly according to some embodiments of the disclosed technologies
Figure 25:
FIG. 25 is a side view of a seal according to some embodiments of the disclosed technologies.
Figure 26:
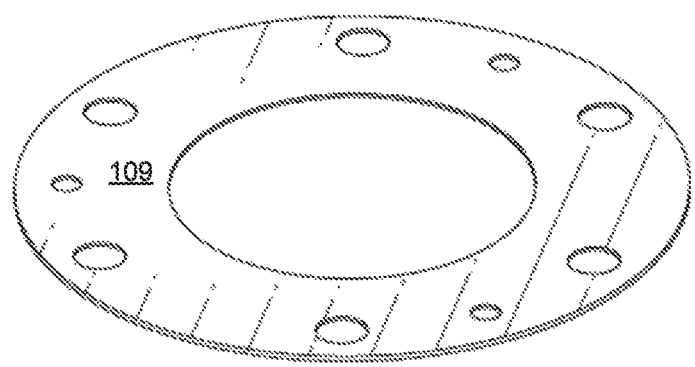
FIG. 26 is an isometric view of a seal according to some embodiments of the disclosed technologies.
Figure 27:
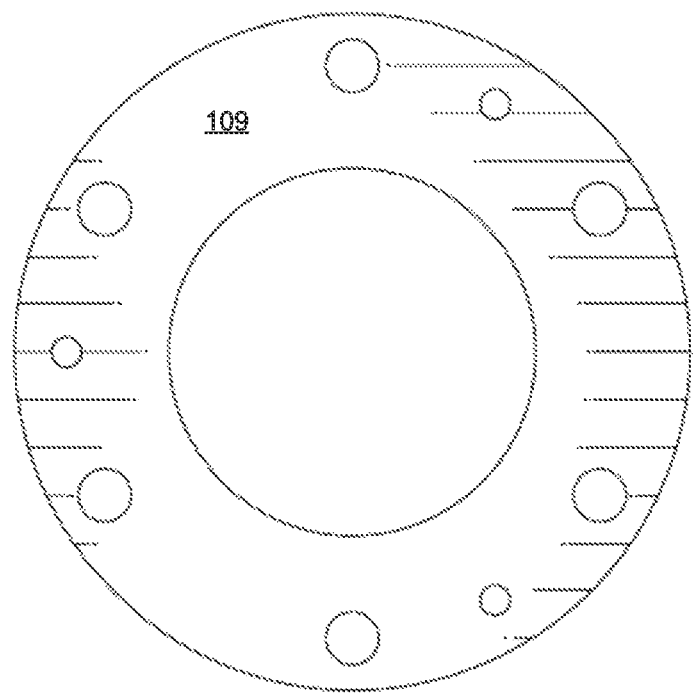
FIG. 27 is a top view of a seal according to some embodiments of the disclosed technologies.

FIG. 24 illustrates the side slide pin 105 of the main body assembly 102 according to some embodiments of the disclosed technologies. FIG. 25 is a side view of a seal 109 according to some embodiments of the disclosed technologies. FIG. 26 is an isometric view of a seal 109 according to some embodiments of the disclosed technologies. FIG. 27 is a top view of a seal 109 according to some embodiments of the disclosed technologies.

FIG. 28 is an isometric view of the flapper assembly 110 of the main body assembly according to some embodiments of the disclosed technologies. FIG. 29 is a side view of the flapper assembly 110 according to some embodiments of the disclosed technologies. FIG. 30 is a top view of the flapper assembly 110 according to some embodiments of the disclosed technologies. In the described embodiments, the flapper assembly 110 has two pedals 112. Other embodiments may have other numbers of pedals. The pedals 112 are hinged with the slide 114 by pins 115. The flapper assembly 110 also includes the slide pin 116.

Figure 31:
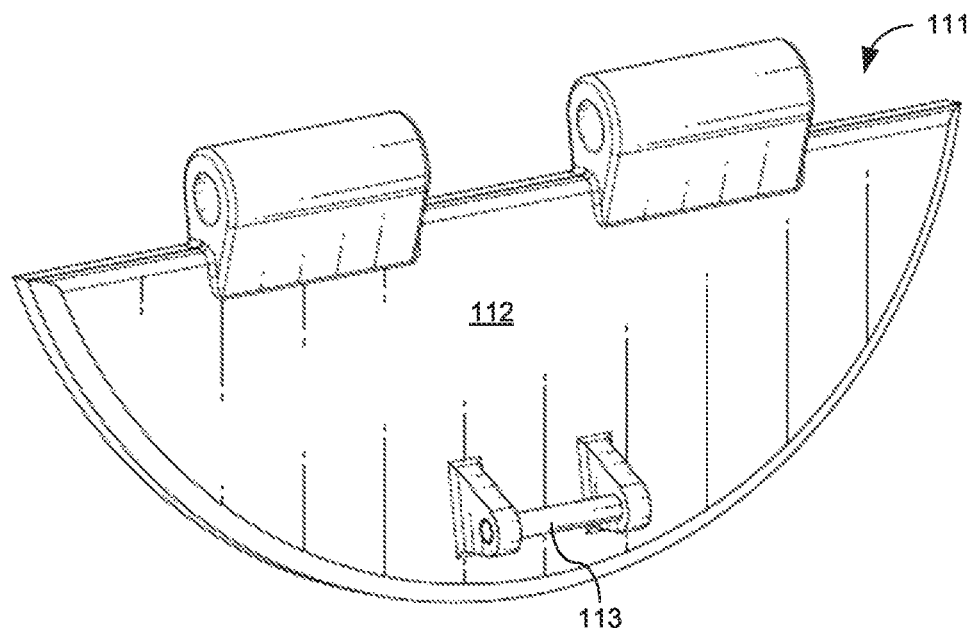
FIG. 31 is an isometric view of the pedal assy of the flapper assembly according to some embodiments of the disclosed technologies.
Figure 32:
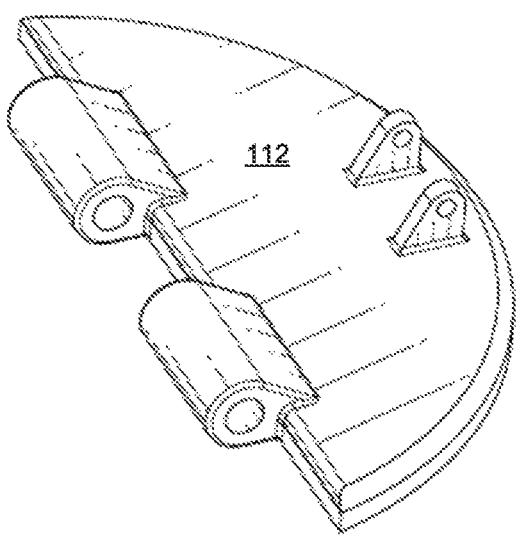
FIG. 32 is an isometric view of the pedal according to some embodiments of the disclosed technologies.
Figure 33:
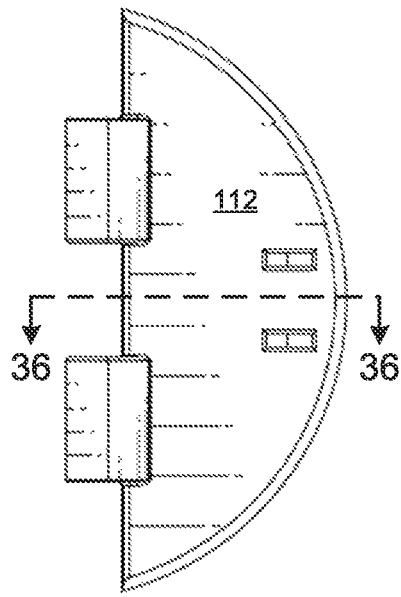
FIG. 33 is a bottom view of the pedal according to some embodiments of the disclosed technologies.
Figure 34:
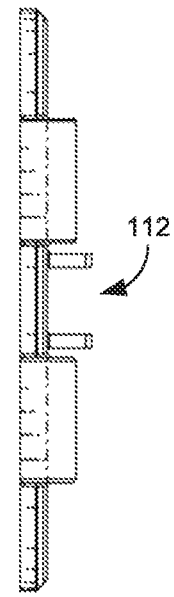
FIG. 34 is a side view of the pedal according to some embodiments of the disclosed technologies.
Figure 35:
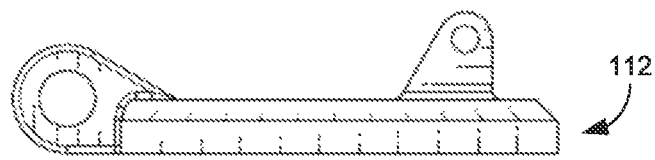
FIG. 35 is a side view of the pedal according to some embodiments of the disclosed technologies.
Figure 36:
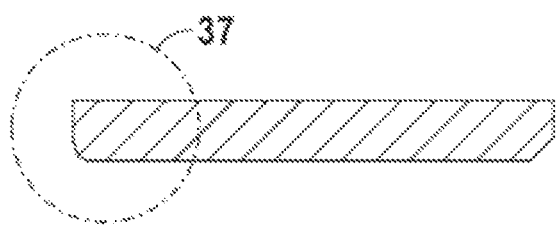
FIG. 36 is a cutaway view of the pedal of FIG. 33 according to some embodiments of the disclosed technologies.
Figure 37:
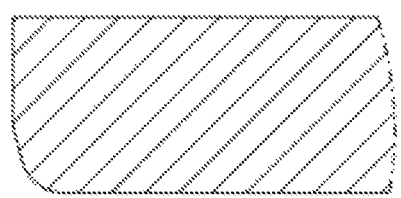
FIG. 37 is a magnified view of the of the cutaway view of the pedal of FIG. 36 according to some embodiments of the disclosed technologies.

FIG. 31 is an isometric view of a pedal assy 111 of the flapper assembly according to some embodiments of the disclosed technologies. FIG. 32 is an isometric view of the pedal 112 according to some embodiments of the disclosed technologies. FIG. 33 is a bottom view of the pedal 112 according to some embodiments of the disclosed technologies. FIG. 34 is a side view of the pedal 112 according to some embodiments of the disclosed technologies. FIG. 35 is a side view of the pedal 112 according to some embodiments of the disclosed technologies. FIG. 36 is a cutaway view of the pedal 112 of FIG. 33 according to some embodiments of the disclosed technologies. FIG. 37 is a magnified view of the of the cutaway view of the pedal 112 of FIG. 36 according to some embodiments of the disclosed technologies. When the slide 114 is in the lower position, the pedals 112 are held in the open position through engagement of the dowel pins with the retention tabs 204 of the saddle 104.

Figure 38:
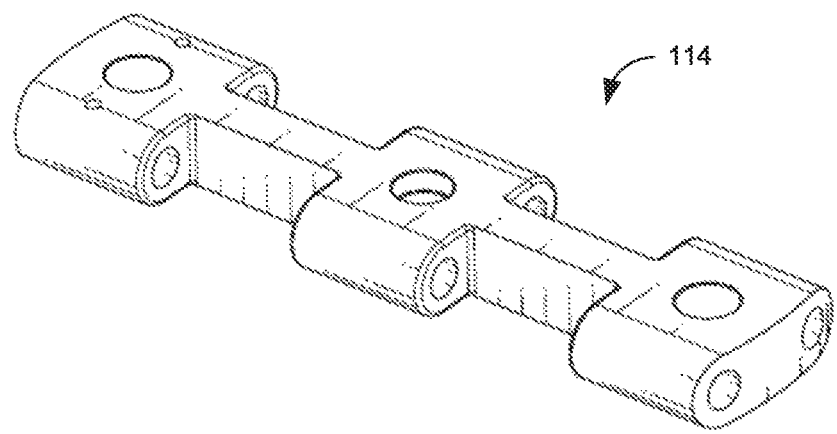
FIG. 38 is an isometric view of the slide of the flapper assembly according to some embodiments of the disclosed technologies.
Figure 39:
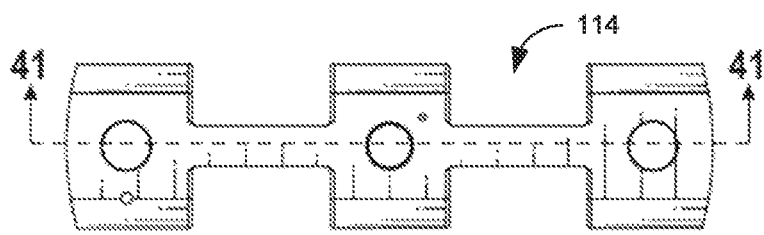
FIG. 39 is a top view of the slide according to some embodiments of the disclosed technologies.
Figure 40:
FIG. 40 is a side view of the slide according to some embodiments of the disclosed technologies.
Figure 41:
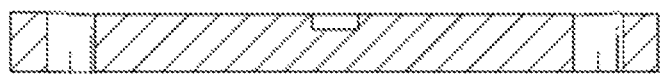
FIG. 41 is a cutaway view of the slide of FIG. 39 according to some embodiments of the disclosed technologies.

FIG. 38 is an isometric view of the slide 114 of the flapper assembly according to some embodiments of the disclosed technologies. FIG. 39 is a top view of the slide 114 according to some embodiments of the disclosed technologies. FIG. 40 is a side view of the slide 114 according to some embodiments of the disclosed technologies. FIG. 41 is a cutaway view of the slide 114 of FIG. 39 according to some embodiments of the disclosed technologies.

Figure 42:
FIG. 42 illustrates the pin securing the flapper to the slide according to some embodiments of the disclosed technologies.

FIG. 42 illustrates the pin 115 of the slide 114 of the flapper assembly 110 according to some embodiments of the disclosed technologies.

Figure 44:
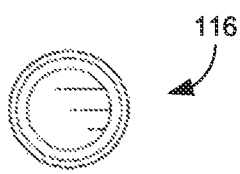
FIG. 44 is a top view of the slide pin according to some embodiments of the disclosed technologies.
Figure 43:
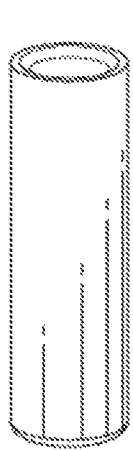
FIG. 43 is a top view of the slide pin of the flapper assembly according to some embodiments of the disclosed technologies.
Figure 45:
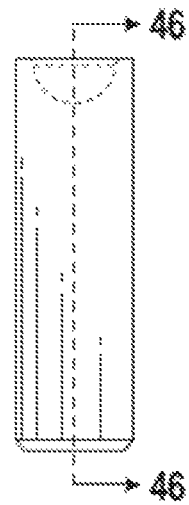
FIG. 45 is a detail view of the slide pin according to some embodiments of the disclosed technologies.
Figure 46:
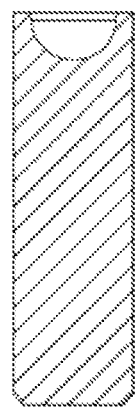
FIG. 46 is a cutaway view of the slide pin of FIG. 45 according to some embodiments of the disclosed technologies.

FIG. 43 is a top view of the slide pin 116 of the flapper assembly 110 according to some embodiments of the disclosed technologies. FIG. 43 is an isometric view of the slide pin 116 according to some embodiments of the disclosed technologies. FIG. 44 is a top view of the slide pin 116 according to some embodiments of the disclosed technologies. FIG. 45 is a detail view of the slide pin 116 according to some embodiments of the disclosed technologies. FIG. 46 is a cutaway view of the slide pin 116 of FIG. 45 according to some embodiments of the disclosed technologies. As can be seen in these views, the upper end of the slide pin 116 may have a recess to accommodate the lower end of the activation rod 122.

Figure 47:
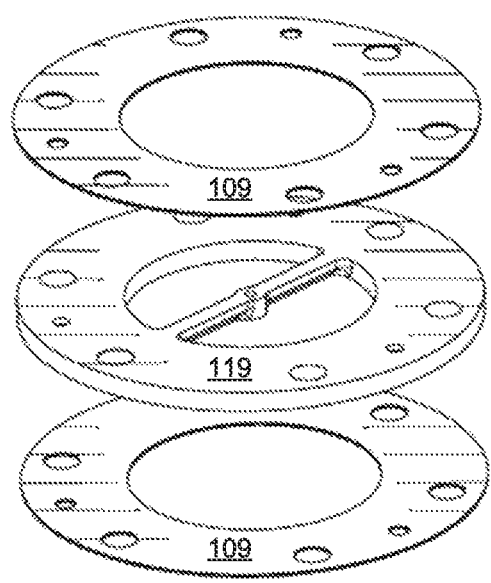
FIG. 47 is an exploded view of the lockout plate and its seals according to some embodiments of the disclosed technologies.
Figure 48:
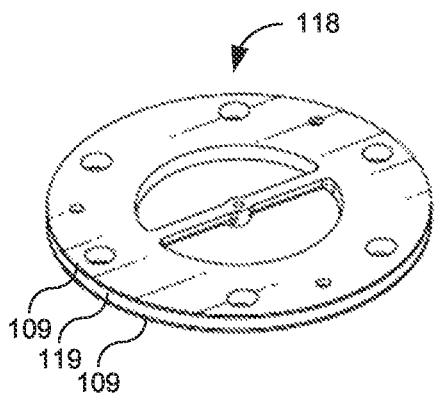
FIG. 48 is an isometric view of the lockout plate and its seals according to some embodiments of the disclosed technologies.

FIG. 47 is an exploded view of the lockout plate 119 and its seals 109 according to some embodiments of the disclosed technologies. FIG. 48 is an isometric view of the lockout plate assy 118 and its seals 109 according to some embodiments of the disclosed technologies.

Figure 49:
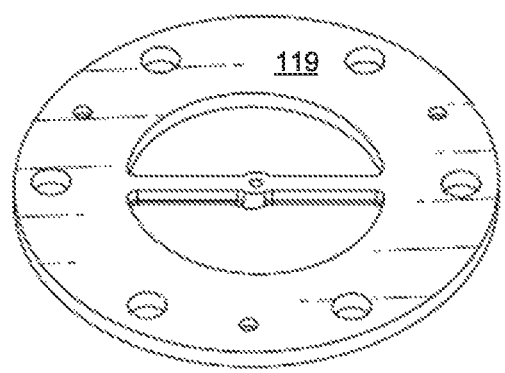
FIG. 49 is an isometric view of the lockout plate according to some embodiments of the disclosed technologies.
Figure 50:
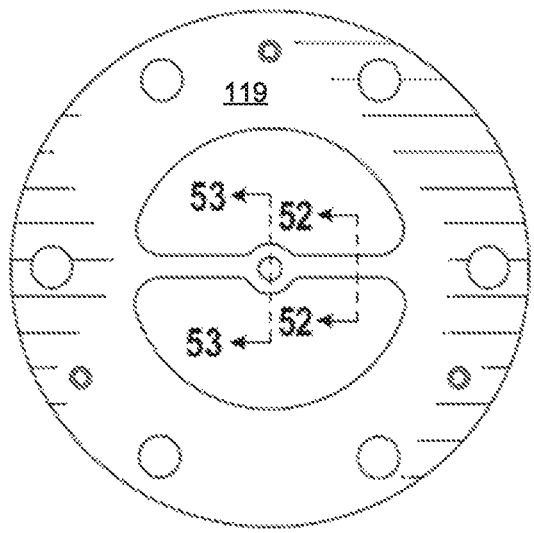
FIG. 50 is a top view of the lockout plate according to some embodiments of the disclosed technologies.
Figure 51:
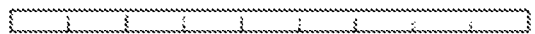
FIG. 51 is a side view of the lockout plate according to some embodiments of the disclosed technologies.
Figure 52:
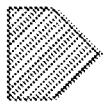
FIG. 52 is a cutaway view of the lockout plate of FIG. 50 according to some embodiments of the disclosed technologies.
Figure 53:
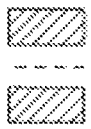
FIG. 53 is a cutaway view of the lockout plate of FIG. 50 according to some embodiments of the disclosed technologies.

FIG. 49 is an isometric view of the lockout plate 119 according to some embodiments of the disclosed technologies. FIG. 50 is a top view of the lockout plate 119 according to some embodiments of the disclosed technologies. FIG. 51 is a side view of the lockout plate 119 according to some embodiments of the disclosed technologies. FIG. 52 is a cutaway view of the lockout plate 119 of FIG. 50 according to some embodiments of the disclosed technologies. FIG. 53 is a cutaway view of the lockout plate 119 of FIG. 50 according to some embodiments of the disclosed technologies.

Figure 54:
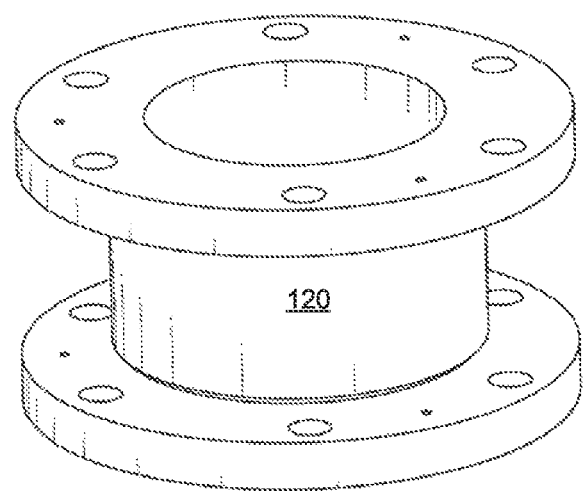
FIG. 54 is an isometric view of the break off collar according to some embodiments of the disclosed technologies.
Figure 55:
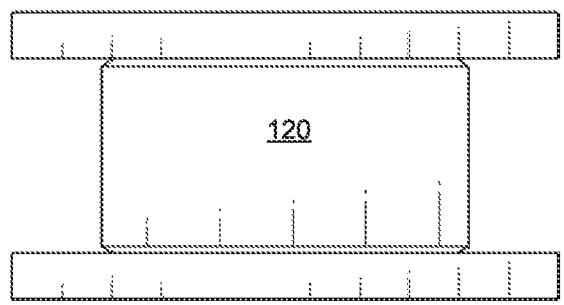
FIG. 55 is a side view of the break off collar according to some embodiments of the disclosed technologies.
Figure 56:
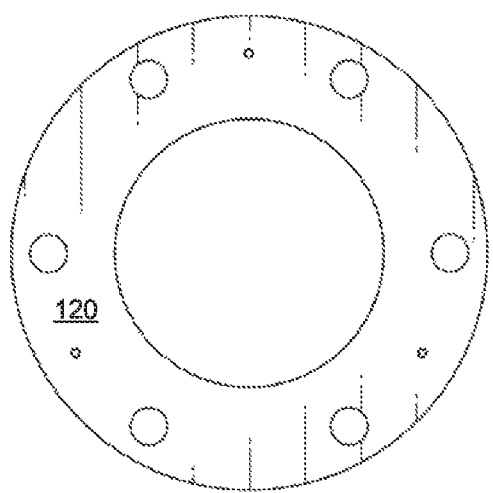
FIG. 56 is a top view of the break off collar according to some embodiments of the disclosed technologies.

FIG. 54 is an isometric view of the break off collar 120 according to some embodiments of the disclosed technologies. FIG. 55 is a side view of the break off collar 120 according to some embodiments of the disclosed technologies. FIG. 56 is a top view of the break off collar 120 according to some embodiments of the disclosed technologies. In these views it can be seen that the breakoff collar 120 is scored in one or more places. During an accident, the breakoff collar may break away along these scores.

Figure 57:
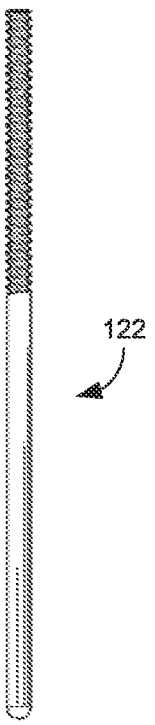
FIG. 57 is a side view of the activation rod according to some embodiments of the disclosed technologies.

FIG. 57 is a side view of the activation rod 122 according to some embodiments of the disclosed technologies. The upper end of the activation rod 122 may be threaded for attachment to the lockout plate 119. The bottom end of activation rod 122 may be rounded to insert into cupped slide pin 116.

During an accident, the fire hydrant 100 will break away at the breakoff bolts 126, at the breakoff collar 120, or both. When this occurs, the lockout plate 119 and the activation rod 122 will follow. Without the pressure of the activation rod 122, the springs 106 will urge the slide 114 upwards, freeing the pedals 112 from the retention tabs 204. The flowing water will force the pedals 112 against the valve seat 206, thereby shutting off the flow of water.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising:
    a valve body having a flange and a valve seat, wherein the valve body is configured to be disposed within a riser, and the flange is configured to mate with a flange of the riser;
    a valve pedal configured to engage the valve seat and prevent fluid flow through the valve seat in a closed position, and to permit fluid flow through the valve seat in an open position;
    a lockout tab disposed within the valve body, wherein the lockout tab maintains the valve pedal in the open position;
    a lockout bar disposed distally from the valve body; and
    an activation rod mechanically coupled to the lockout bar and configured to keep the valve pedal engaged with the lockout tab.

2. The apparatus of claim 1, wherein the flange is further configured to mate with a flange of a hydrant.

3. The apparatus of claim 1, wherein when the activation rod is not present, the valve pedal disengages from the lockout tab, and a flow of fluid passing the valve pedal moves the valve pedal from the open position to the closed position.

4. The apparatus of claim 1, further comprising:

a spring configured to urge the valve pedal away from the lockout tab;

wherein, when the activation rod is not present, the spring causes the valve pedal to disengage from the lockout tab, and a flow of fluid passing the valve pedal moves the valve pedal from the open position to the closed position.

5. The apparatus of claim 1, further comprising:

a collar disposed between the lockout bar and the valve body.

6. The apparatus of claim 5, wherein the collar is a breakaway collar.

7. The apparatus of claim 5, further comprising:

a hydrant, wherein the collar is secured to the hydrant by a breakaway collar.

8. The apparatus of claim 1, further comprising:

a valve slide slidably mounted within the valve body, wherein the valve pedal is pivotally mounted to the valve slide, and wherein the activation rod is configured to press the slide toward the lockout tab; and a spring configured to urge the valve slide away from the lockout tab.

9. The apparatus of claim 1, further comprising:

a bottom saddle comprising the lockout tab, wherein the bottom saddle is fixedly mounted within the valve body.

10. The apparatus of claim 1, further comprising:

a lockout ring disposed distally from the valve body, the lockout ring comprising the lockout bar.

11. The apparatus of claim 1, further comprising:

a spring configured to urge the valve pedal from the open position toward the closed position.

* * * * *